S. Pence,
Cage Trap,
No. 69,695.      Patented Oct. 8, 1867.
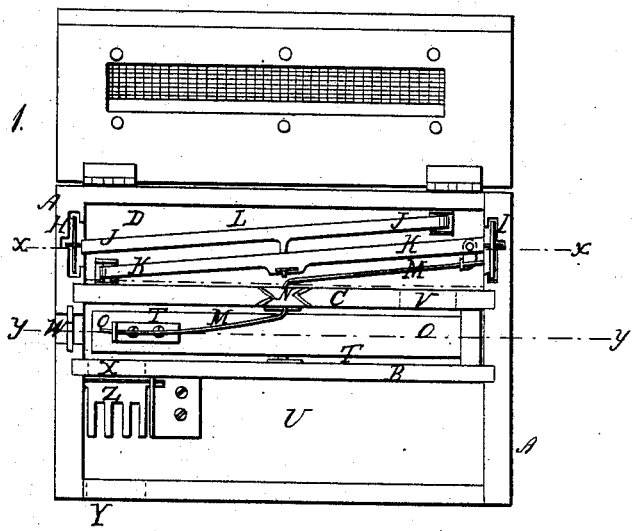
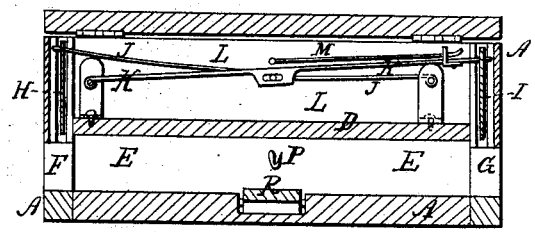
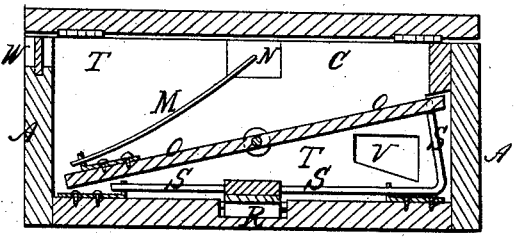
Witnesses:
J. A. Service
Theo Tusche
Inventor;
Saml Pence
Per Munn & Co
Attorneys.

United States Patent Office.

SAMUEL PENCE, OF EATON, OHIO.

*Letters Patent No. 69,695, dated October 8, 1867.*

IMPROVEMENT IN ANIMAL TRAPS.

*The Schedule referred to in these Letters Patent and making part of the same.*

TO ALL WHOM IT MAY CONCERN:

Be it known that I, SAMUEL PENCE, of Eaton, in the county of Preble, and State of Ohio, have invented a new and improved Animal Trap; and I do hereby declare that the following is a full, clear, and exact description thereof, which will enable others skilled in the art to make and use the same, reference being had to the accompanying drawings, forming part of this specification, in which—

Figure 1 is a top or plan view of my improved trap, the lid or cover being turned back.

Figure 2 is a vertical longitudinal section of the same, taken through the line $x$ $x$, fig. 1.

Figure 3 is a vertical longitudinal section of the same, taken through the line $y$ $y$, fig. 1.

Similar letters of reference indicate like parts.

My invention has for its object to furnish an improved animal trap, of that class in which each animal as it is caught sets the trap for the succeeding one; and it consists in the combination of the levers or springs, vertical slide doors, and tilting-platform with each other and with the contiguous compartments; in the combination of the spring-platform and bent-lever catch with the tilting-platform; and in the arrangement of the compartments, doors, and windows; the whole being constructed and arranged as hereinafter more fully described.

A is the box of the trap, which is divided into four compartments by the vertical partitions B and C, and the horizontal partition D. The compartment E, beneath the horizontal partition, is a close passage-way or hall, extending from end to end of the box, having a door-way at each end, as shown in fig. 2. The door-ways F and G are closed by slides H and I sliding up and down in grooves formed in the end boards of the box A, as shown in figs. 1 and 2. J and K are levers, placed in the compartment L, and one end of each of which is pivoted to ears attached to the upper side of the partition D, near its ends. Their other ends are pivoted to the upper edges of the slides H and I; and they are pivoted to each other at their middle parts, so that the said levers and said slides may all move together. M is a bent lever, which has its fulcrum in the block N, let into the upper edge of the partition C, through which block it passes, and one end of which is pivoted to an ear formed upon or attached to one of the levers, as K, near the end, which is pivoted to the slide I. The other end of the lever M is pivoted to an eye attached to the upper side of the tilting-platform O, as shown in figs. 1 and 3. P is the bait-hook, which is attached to the middle part of the side wall of the compartment E. R is a spring or lever-platform, pivoted in a recess in the bottom of the box A, one end of which is immediately beneath the bait-hook P, and the other end is connected with the bent-lever catch S, pivoted in the lower part of the compartment T. One end of the lever S is bent upward, and has a shoulder, a catch formed upon its upper end, which, when the trap is set, takes hold of the tilting-platform O, and holds it until released by the action of the spring-platform R. The tilting-platform O is pivoted at its middle part to the partitions B and C, as shown in fig. 1. U is the compartment in which the animals are caged.

When the trap is set, its various parts are in the positions shown in the drawings. The animal enters through the door-way F or G, and steps upon the spring-platform R, which releases the tilting-platform O from the lever catch S, allowing the levers M J K to reverse the position of the said platform O, and lower the slides H and I. This closes the door-ways F and G, and shuts out all light from the compartment E, except what comes through the door-way V, through which the frightened animal immediately runs, and seeing the light shining through the window W, he thinks that a way of escape, and endeavors to reach it by passing up the inclined platform O. As he passes above the pivoting point of said platform, his weight tilts it in the opposite direction, again setting the trap, and leaving the animal at the bottom of the compartment T, opposite the door-way X, through which he sees the light shining from the window Y. The animal immediately passes through the door-way X, lifting the drop-gate Z, which drops behind him, and he finds himself caged in the compartment U, from which he cannot escape.

What I claim as new, and desire to secure by Letters Patent, is—

The construction and arrangement of the levers J K, one end of each being pivoted to the partitions in the chamber L, and the other ends to the slides H I, and pivoted to each other in the centre; the bent lever M, secured at one end to the bar K, and passing through the block N in partition C, secured to the tilting-platform O in the centre chamber; the spring R and lever catch S, as herein described for the purpose set forth.

SAMUEL PENCE.

Witnesses:
JOHN V. CAMPBELL,
JAMES A. GILMORE.